United States Patent
Bond et al.

(10) Patent No.: US 10,271,568 B2
(45) Date of Patent: Apr. 30, 2019

(54) POPCORN MACHINE WITH CANOPY

(71) Applicant: Nostalgia Products LLC, Green Bay, WI (US)

(72) Inventors: Gregg Bond, Beverly Hills, CA (US); Edward E. Boughton, III, Ventura, CA (US)

(73) Assignee: NOSTALGIA PRODUCTS LLC, Green Bay, WI (US)

( * ) Notice: Subject to any disclaimer, the term of this patent is extended or adjusted under 35 U.S.C. 154(b) by 149 days.

(21) Appl. No.: 14/875,420

(22) Filed: Oct. 5, 2015

(65) Prior Publication Data
US 2017/0094992 A1  Apr. 6, 2017

(51) Int. Cl.
*A23L 7/174* (2016.01)
*A23L 7/183* (2016.01)

(52) U.S. Cl.
CPC .............. *A23L 7/183* (2016.08); *A23L 7/174* (2016.08)

(58) Field of Classification Search
CPC ........ A23L 7/187; A23L 7/183; A23L 1/1812; A23L 5/15; A23L 7/161; A23L 1/18; A23L 1/1815; A23L 7/191; G07F 17/0078; G07F 17/0085; H05B 6/6485; H05B 6/707; H05B 6/782; H05B 6/701; H05B 6/647; H05B 6/6473; H05B 6/70; H05B 6/80
USPC .............. 99/323, 323.9, 323.5, 323.7, 323.8; 426/445, 450; 118/19
See application file for complete search history.

(56) References Cited

U.S. PATENT DOCUMENTS

| | | | | |
|---|---|---|---|---|
| 3,570,388 A | * | 3/1971 | Gottlieb | A23L 7/187 99/323.5 |
| 4,072,091 A | * | 2/1978 | Richardson | A47J 36/2433 219/214 |
| 4,158,760 A | * | 6/1979 | Bowen | A47J 36/027 219/432 |
| 4,178,843 A | * | 12/1979 | Crabtree | A23L 7/187 426/445 |
| 4,445,427 A | * | 5/1984 | Kiczek | A23L 7/187 99/323.11 |
| 4,727,798 A | * | 3/1988 | Nakamura | A23L 7/187 99/323.5 |
| 4,763,568 A | * | 8/1988 | Kiczek | A23L 7/187 219/400 |
| 4,873,406 A | * | 10/1989 | Connor | A47J 36/027 219/735 |

(Continued)

*Primary Examiner* — Tu B Hoang
*Assistant Examiner* — Vy T Nguyen
(74) *Attorney, Agent, or Firm* — Womble Bond Dickinson (US) LLP

(57) ABSTRACT

A device for making popcorn. A heating element and a fan are contained within a base housing. The base housing includes an agitator and convection unit unit having a bottom and a side portion located above the heating element and fan. The side portion includes louvers configured to allow heated air provided by operation of the heating element and fan to circulate around the agitator and convection unit and cause corn kernels added to the agitator and convection unit to be heated so as to form popcorn. A bowl surrounds the base housing such that the base housing, agitator and convection unit and bowl have a common axis. A canopy is removably mated to the base housing and is configured so that when popcorn is expelled from the agitator and convection unit, it strikes a bottom surface of the canopy and is guided into the bowl.

5 Claims, 5 Drawing Sheets

(56) References Cited

U.S. PATENT DOCUMENTS

| | | | | |
|---|---|---|---|---|
| 5,421,253 A * | 6/1995 | Rehmeyer | ............... | A23L 7/187 |
| | | | | 99/323.5 |
| 5,500,237 A * | 3/1996 | Gell, Jr. | ................. | A23F 5/046 |
| | | | | 34/360 |
| 5,501,139 A * | 3/1996 | Lee | ......................... | A23L 7/187 |
| | | | | 99/323.5 |
| 6,187,353 B1 * | 2/2001 | Wyman | ............... | G07F 17/0078 |
| | | | | 426/233 |
| 6,460,451 B1 * | 10/2002 | Helman | .................. | A23L 7/187 |
| | | | | 99/323.5 |
| 7,024,986 B2 * | 4/2006 | Kurosawa | ............... | A23L 7/187 |
| | | | | 99/323.5 |
| 9,357,794 B2 * | 6/2016 | Mastroianni | ............ | A23L 7/183 |
| 2006/0042472 A1 * | 3/2006 | Shore | ...................... | A23L 7/187 |
| | | | | 99/323.5 |
| 2007/0056448 A1 * | 3/2007 | Kernan | .................. | A23L 7/183 |
| | | | | 99/323.5 |

\* cited by examiner

POPCORN MACHINE WITH CANOPY

FIELD OF THE INVENTION

The present invention relates to devices for making popcorn.

BACKGROUND ART

U.S. Pat. No. 6,460,451 is directed to a popcorn making machine and notes that popcorn is typically made by cooking uncooked corn kernels, which expand and burst into popped corn, the popped corn commonly being called "popcorn." Each of the corn kernels contains a small amount of water stored within a layer of soft starch, the soft starch being surrounded by the corn kernel's outer surface of hard starch. As heat is applied to the corn kernel, the corn kernel heats up, the water within the corn kernel begins to expand, and pressure builds against the hard starch. Eventually, this outer surface of hard starch gives way, causing the corn kernel to explode. As the corn kernel explodes, the soft starch inside the corn kernel becomes inflated and bursts, turning the corn kernel inside out. The steam created by heating the water inside the kernel is released, and the popcorn is popped.

The popcorn maker described in U.S. Pat. No. 6,460,451 uses a combination of heating, agitation, and convection to convert the corn kernels into popcorn, and expel the popcorn out of the popcorn maker, and further describes that the popcorn maker should be easy to use, the corn kernels and the popcorn easily viewable and fun to watch during popping, the popcorn maker producing the popcorn in a quick, convenient, and efficient manner. In the prior art, the popcorn maker discharges the popcorn from a discharge chute into a receptacle of choice. The heating, agitation and convection of the prior art popcorn maker is performed by a fan, a heating element, and an agitator and convection unit. The agitator and convection unit is substantially cup shaped, having a bottom and a substantially cylindrical wall having a plurality of louvers therein. The louvers are disposed so as to direct heated air from the fan and heating element downward and towards a central portion of the bottom of the agitator and convection unut. The fan in the base of the popcorn maker draws air heated by the heater into the agitator and convection unit, the fan forcing the heated air through the louvers and into the agitator and convection unit. The heated and impelled air heats and agitates corn kernels in the agitator and convection unit, so that the corn kernels are converted to popcorn. The heated and impelled air also causes the popcorn to be expelled from the top of the agitator and convection unit into and out of a chimney, into a removably mating cover and then out via the discharge chute.

SUMMARY OF THE INVENTION

The present invention is directed to a popcorn maker which utilizes a combination heater, agitator and convection unit of the type described in U.S. Pat. No. 6,460,451 to convert the corn kernels to popcorn. However, rather than discharging the popcorn from a discharge chute into a receptacle, the invented popcorn maker uses a bowl and canopy wherein the bowl surrounds the combination heater, agitator and convection unit and the canopy fits over the bowl so that popcorn which is expelled by operation of the combination heater, agitator and convection unit, hits a bottom surface of the canopy and is then directed into the bowl by the canopy. The canopy is a generally dome shaped structure which is placed over the bowl and combination heater, agitator and convection unit so that each piece of popped corn as it rises out of the agitator and convection unit hits the bottom surface of the canopy, and due to the shape of the canopy, bounces off the canopy into the bowl which surrounds the canopy and the combination heater, agitator and convection unit.

The canopy is removably attached to an upper portion of the agitation and convection unit so that when the popcorn has finished popping and all of the popcorn is in the bowl, the bowl and attached canopy can be lifted up and over the combination heater, agitator and convection unit. The canopy connects to the agitation and convection unit by friction connection elements, and by applying a lifting force to the bowl, the friction force is overcome so that the canopy separates from the agitation and convection unit and rests on top of the bowl.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
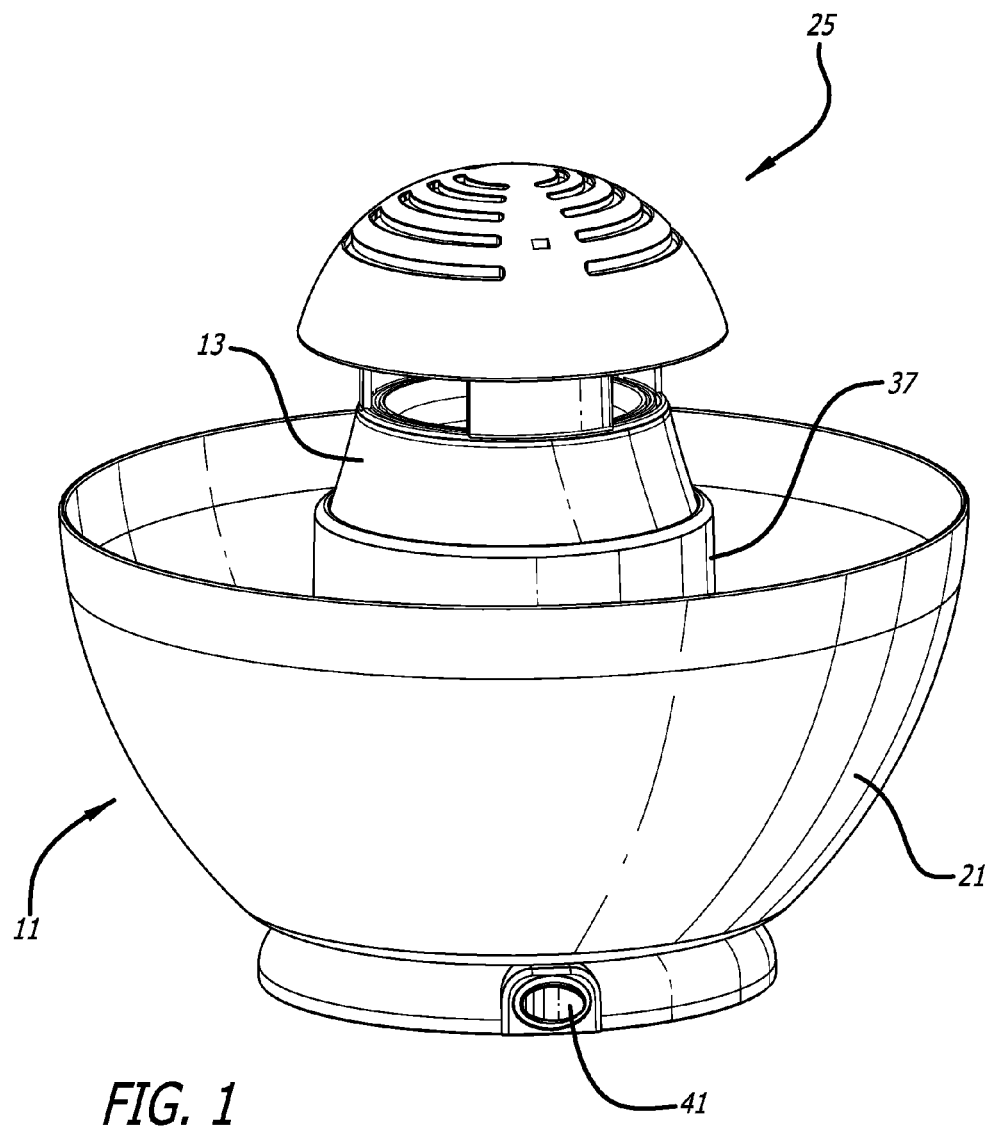
FIG. 1 is a perspective view of a popcorn maker, constructed in accordance with the present invention.
Figure 2:
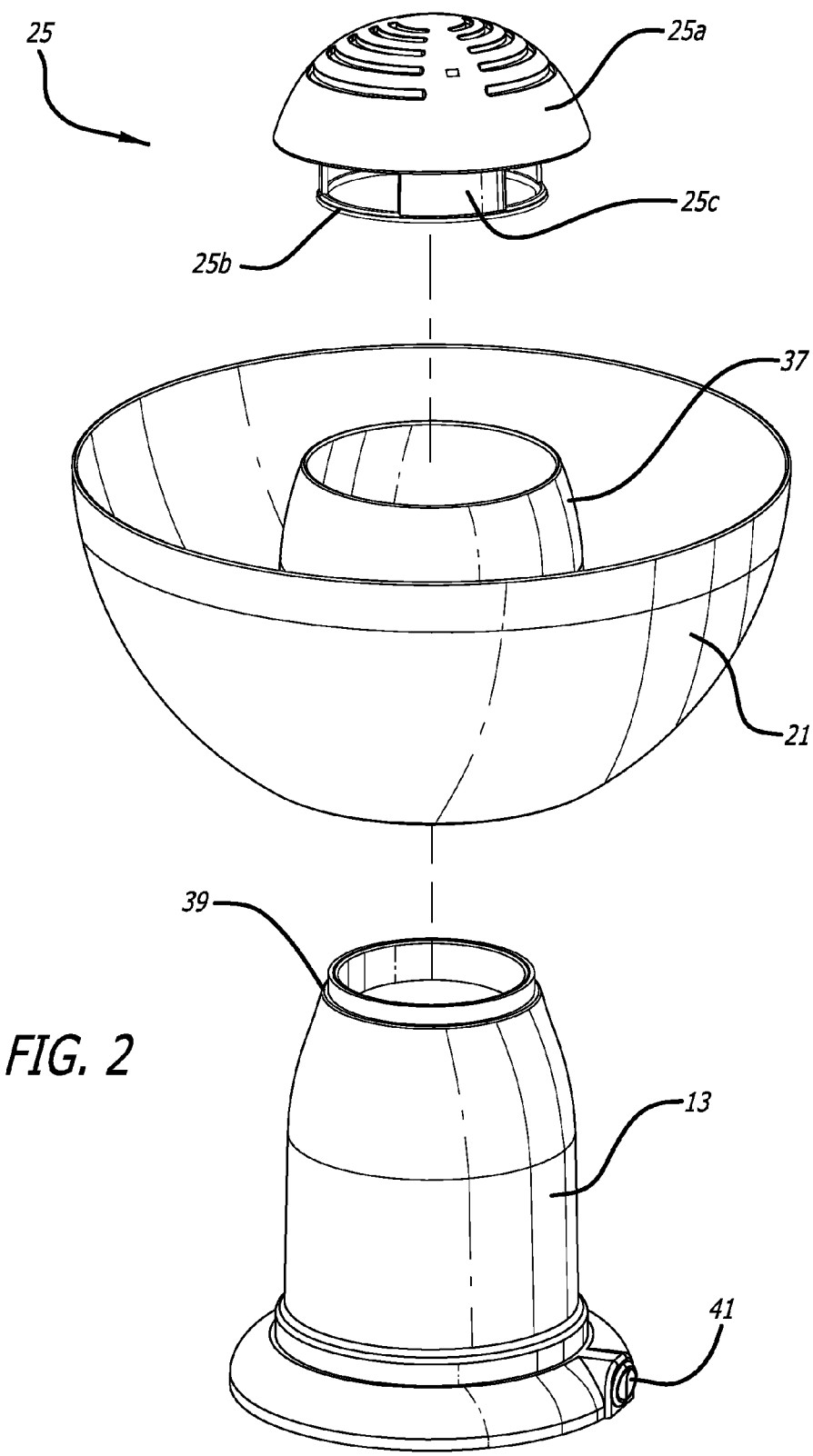
FIG. 2 is an exploded view of the popcorn maker, bowl and canopy.
Figure 3:
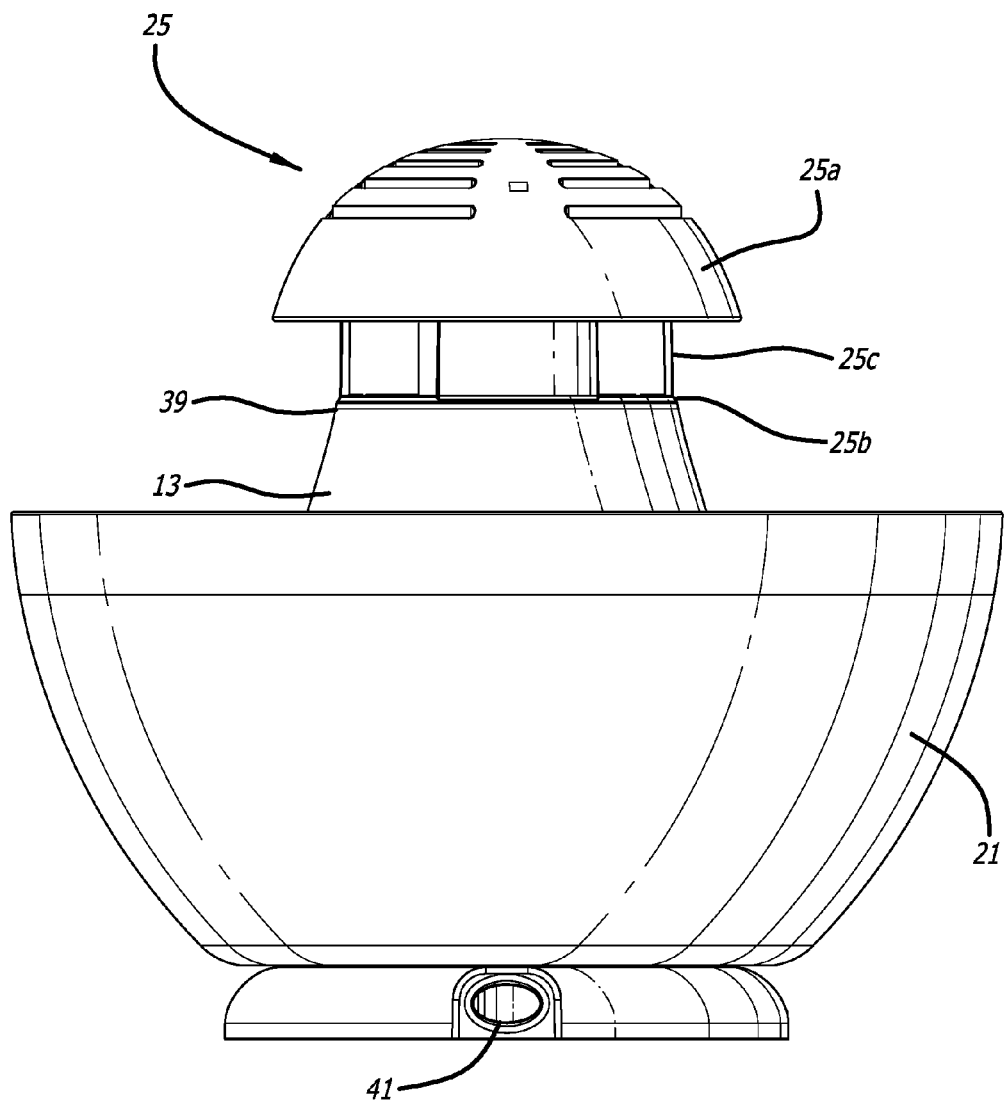
FIG. 3 is a front view of the popcorn maker of FIG. 1.

The preferred embodiments of the present invention will be described with reference to FIGS. 1-5. Identical elements in the various figures are identified with the same reference numbers.

FIGS. 1-5 show an embodiment of the present invention, a popcorn maker 11 for heating and popping corn kernels into popped corn, hereinafter also called popcorn. The corn kernels are typically popped into popcorn at an optimum popping temperature produced by a heater which is well known in the art. The popcorn maker 11 has base housing 13 having combination heater, agitator and convection unit 17 substantially centrally located coaxially within base housing 13, and removable bowl 21 and canopy 25. The corn kernels are converted to popcorn 15 by a combination of heating, agitation and convection in the combination heater, agitator and convection unit 17, and expelled from the base housing 13 by convection and gravity.

Figure 4:
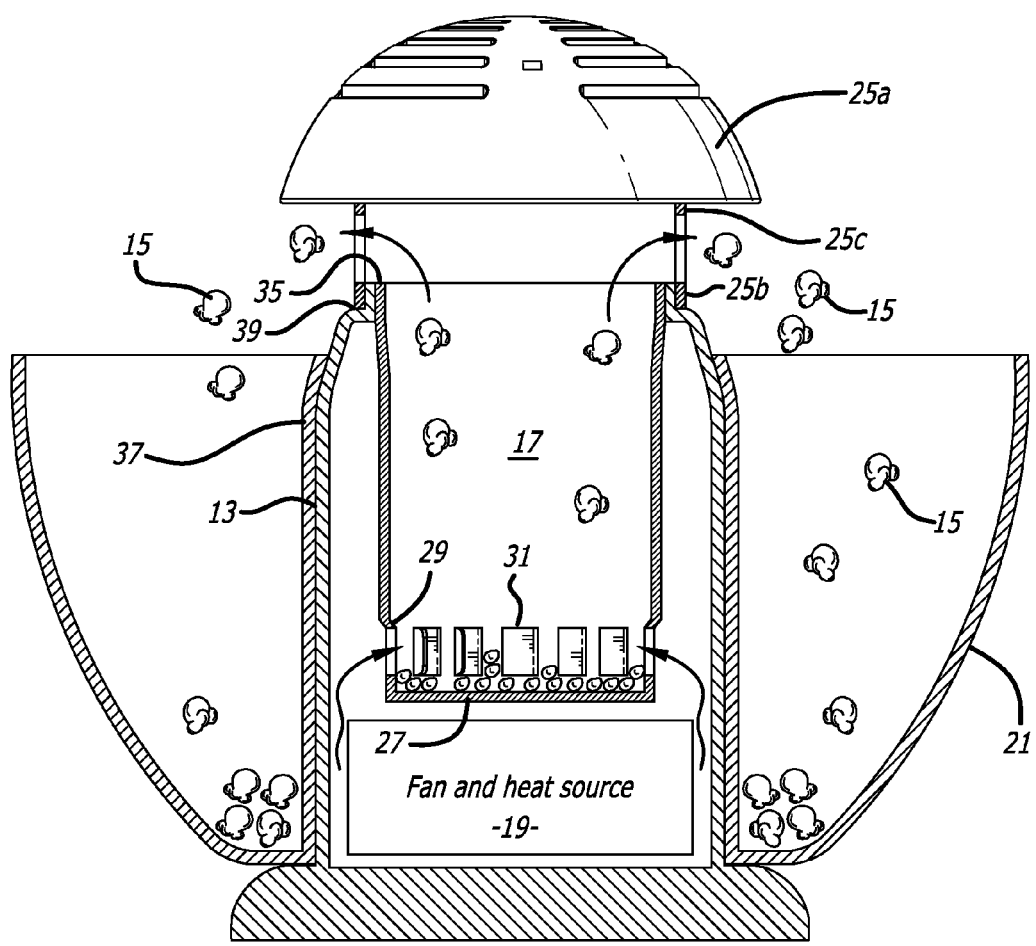
FIG. 4 is a side section view of the popcorn maker of FIG. 1 taken along line III-III of FIG. 2.
Figure 5:
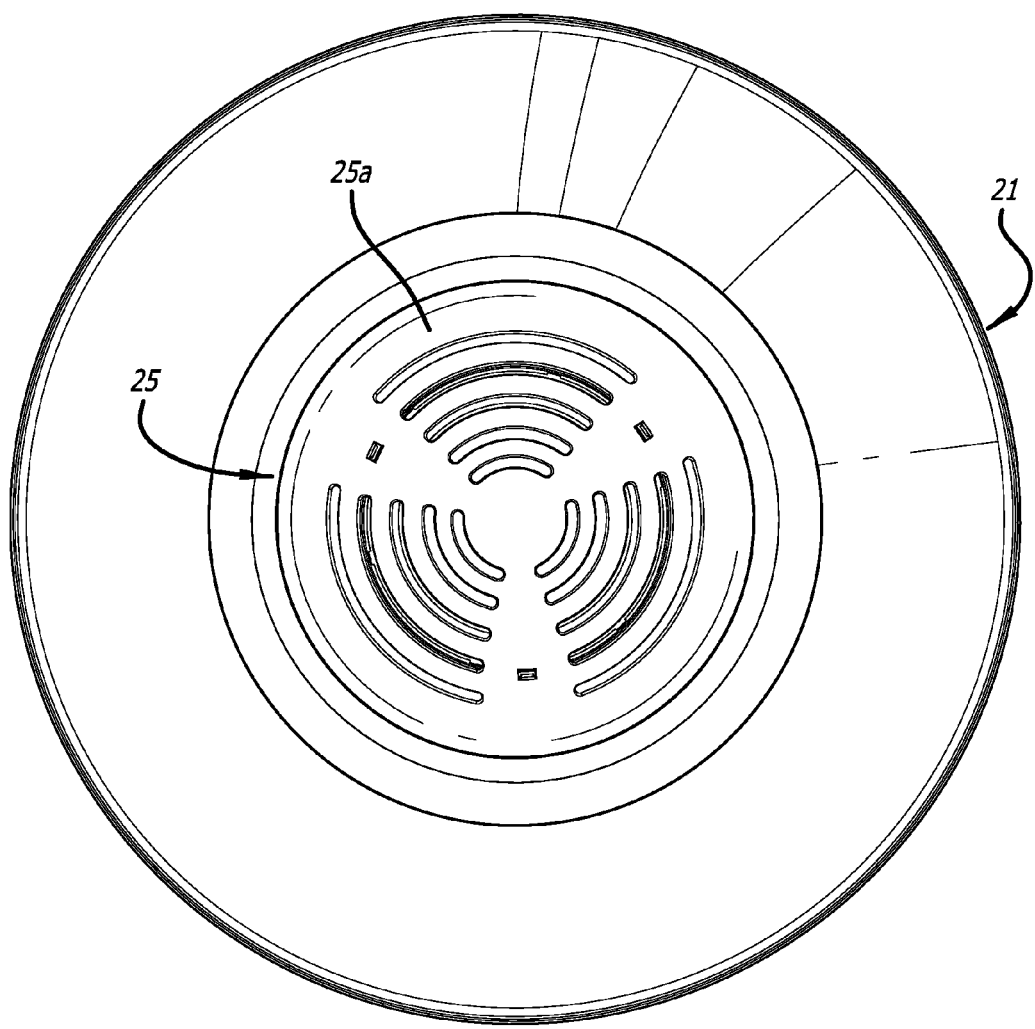
FIG. 5 is top view of the popcorn maker of FIG. 1 showing the bowl and canopy.

The combination heater, agitator and convection unit has a heater housing, heating element, fan/blower shown in FIG. 4 as heat source 19, and agitator and convection unit 17, which is cup shaped and has bottom 27 and wall 29 having a plurality of louvers 31. Above the louvers, a chimney 33 and chimney top 35 extend from the louvers portion of the agitator and convection unit 17. The chimney and chimney top may form a unitary construction with the agitator and convection unit or may be permanently or removable connected to the agitator and convection unit, the specifics of this construction not being relevant to the invention.

The agitator and convection unit 17, the chimney 33, and the chimney top 35 are substantially coaxial with each other, and, in an embodiment, each are substantially cylindrically shaped, although other shapes may be utilized without departing from the invention. The agitator and convection unit and the chimney and chimney are preferably of unitary construction, but, as previously described, may be separate elements.

Each of the louvers 31 on the wall of the agitator and convection unit 17 and is formed by a slot with arcuate and/or straight edges. The louvers are disposed so as to direct hot air provided by the heater exiting from the slots toward the center of the agitator and convection unit 17. The hot air circulates cyclonically inwardly, so as to heat, circulate, and agitate the corn kernels about the center of the agitator and convection unit creating an updraft of the popcorn 15 which is expelled from the top of the chimney, hitting the bottom surface of the canopy and guided into the bowl. Details regarding the louvers and operation of the combination heater, agitator and convection unit and chimney are fully described in U.S. Pat. No. 6,460,451 which details are incorporated herein by this reference.

The canopy 25 has a diameter larger than the diameter of the agitator and convection unit 17, chimney 33 and chimney top 35. The bowl which surrounds base housing 13 has a larger diameter than diameter of canopy 25. Although the specific diameters of the canopy bowl and diameter of the chimney top, and relationship of one to the other, are not critical to an understanding of the invention, they do need to be sized so that popcorn expelled from the chimney top is then blocked by the canopy 25 which deflects the popcorn into the bowl 21. The canopy 25 includes a dome shaped top portion 25a, a base portion 25b and connectors 25c which are strips which connect top portion 25a to bottom portion 25b. The canopy also deflects a portion of heat emanating from the chimney top back into the chimney top and the agitator and convection unit 17.

As best seen in FIG. 4, bowl 21 includes an inner wall 37 which extends to near the top of base housing 13 which includes a shoulder portion 39. This shoulder portion mates with the bottom of base portion 25b fits so that the base portion 25b is rests on shoulder 39 when canopy 25 is in place on base housing 13. Connectors 25c are sized and shaped so that the base portion 25a and bottom portion 25b form a unitary structure, but with sufficient space between the top surface of base portion 25b and bottom surface of top portion 25a to allow popcorn which is expelled from agitator and convection unit 17 to pass between the space formed by the connectors 25c and then fall into bowl 21.

When the popcorn has finished popping, the agitator and convection unit will have little or no remaining corn kernels and the popcorn expelled from the agitator and convection unit 17 will be in the bowl 21.

In use, the canopy 25 is removed from the base unit 13 so that corn kernals can be placed into the agitator and convection unit 17. After the corn kernals are placed into the agitator and convection unit 17, the canopy is placed onto base unit 13 so that base portion 25 rests on shoulder portion 39 so that the canopy mates with base housing 13. Then, a switch 41 is used to apply power to fan and heat source 19 which applies heat to agitator and convection unit 17 and forces hot air through louvers 31. As agitator and convection unit 17 heats up, the corn kernals are converted to popcorn and due to popping of the corn kernals and hot air forced through louvers 31 by operation of the fan, the popcorn rises out of agitator and convection unit 17 and chimney 33. The popcorn is then directed by canopy 25 through the spaces between canopy top portion 25a and bottom portion 25b into bowl 21. When the kernals have finished popping, switch 41 is used to remove power from fan and heat source 19. Then bowl 21 is lifted up and over base housing 13. Since the diameter of canopy top portion 25a is larger than the diameter of inner wall 37 of bowl 21, canopy 25, this also results in canopy 25 being disconnected from base housing 13 so that it rests on inner wall 37 as bowl 21 is lifted.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A device for making popcorn comprising:
    a) a heating element and a fan disposed within a base housing of the device;
    b) an agitator and convection unit disposed within said base housing, said agitator and convection unit disposed above said heating element and fan, said agitator and convection unit having a bottom and a side portion extending from said bottom, said side portion including louvers configured to allow heated air provided by operation of said heating element and fan to circulate around said agitator and convection unit and cause corn kernels when added to said agitator and convection unit to be heated so as to form popcorn which is expelled from said agitator and convection unit as said popcorn is formed;
    c) a bowl having an outer wall and an inner wall in contact with and configured to surround said base housing wherein when said bowl is placed over said base housing, said base housing, said agitator and convection unit and said bowl have a common axis;
    d) a canopy removably and frictionally mated to said base housing and when mated to said base housing has a same axis as said common axis, wherein said canopy is configured so that said popcorn which is expelled from said agitator and convection unit strikes a bottom surface of said canopy and is guided into said bowl in a space between said outer wall and said inner wall, wherein said outer wall has a diameter larger than a diameter of said canopy, where said canopy diameter is measured across its largest extent, wherein when said canopy is frictionally removed from said base housing, a bottom portion of said canopy is separated from said base housing and rests on a top portion of said inner wall.

2. The device defined by claim 1 wherein said agitator and convection unit is cup shaped.

3. The device defined by claim 1 wherein said canopy includes a top portion, and a bottom portion with strips connecting said top portion and said bottom portion, said strips sized to form a space between said top portion and said bottom portion through which said popcorn passes into said bowl when expelled from said agitator and convection unit.

4. The device defined by claim 3 wherein said top portion is dome shaped.

5. The device defined by claim 3 wherein said bottom portion mates with a shoulder portion of said base housing.

* * * * *